H. R. DARLING.
FOLDING CAMERA.
APPLICATION FILED JULY 24, 1915.
1,211,683.
Patented Jan. 9, 1917.
2 SHEETS—SHEET 1.
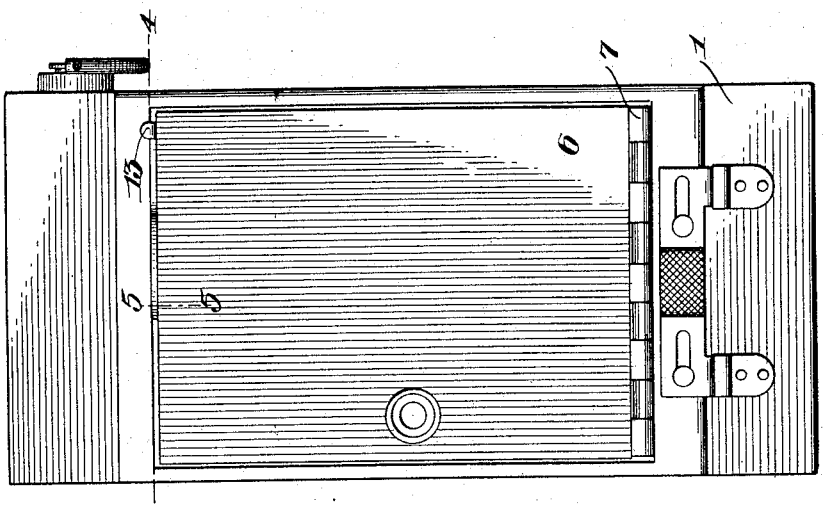
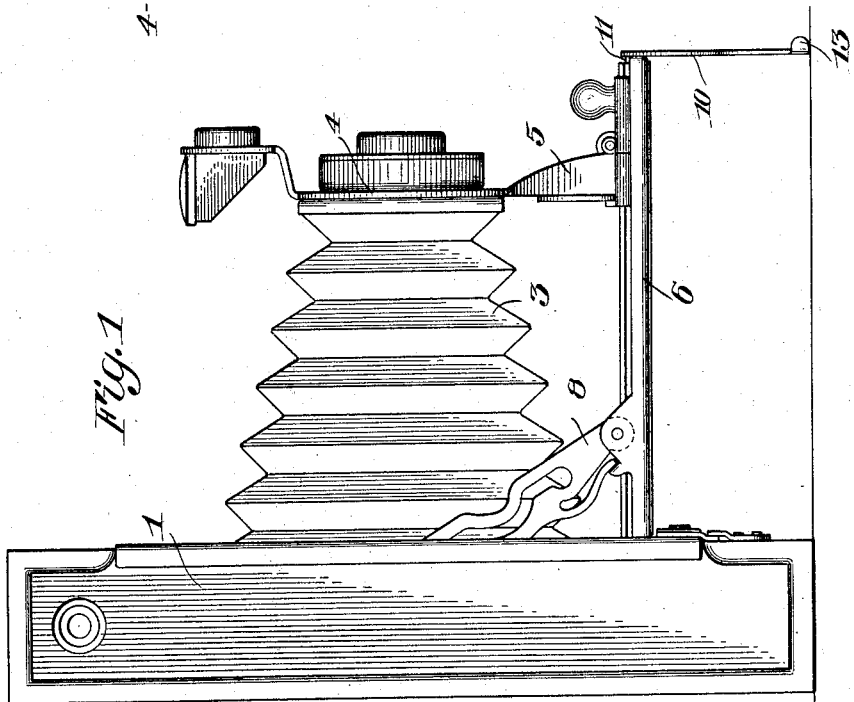
WITNESSES:
Nelson H. Copp
Walter B. Payne
INVENTOR
Harry R. Darling
BY
his ATTORNEYS H. R. DARLING.
FOLDING CAMERA.
APPLICATION FILED JULY 24, 1915.
1,211,683.
Patented Jan. 9, 1917.
2 SHEETS—SHEET 2.
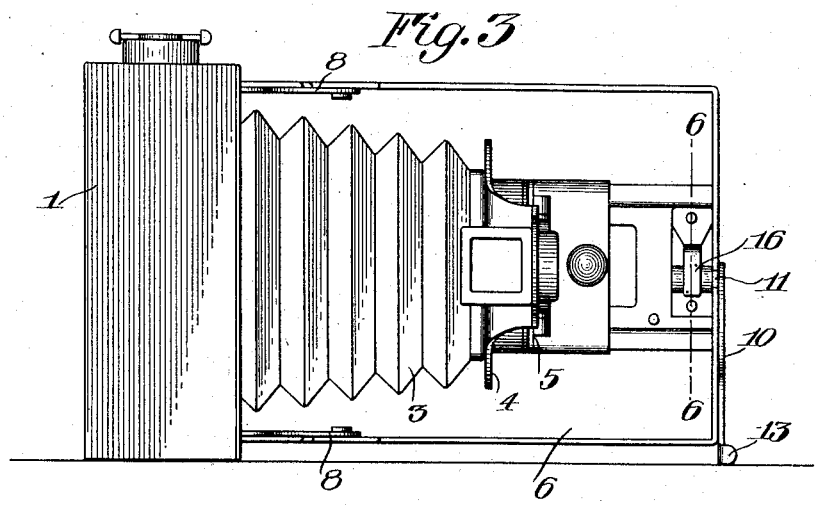
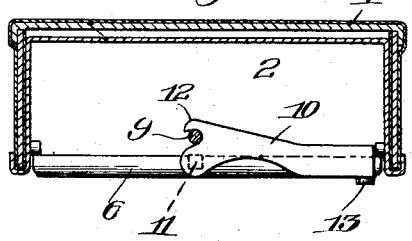
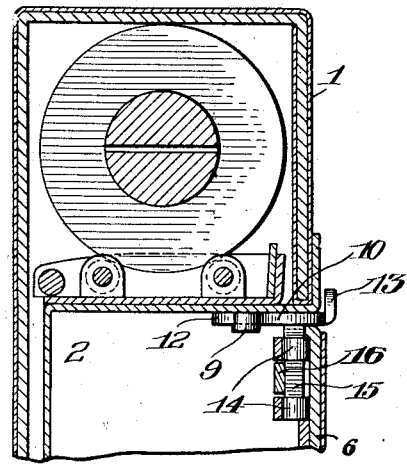
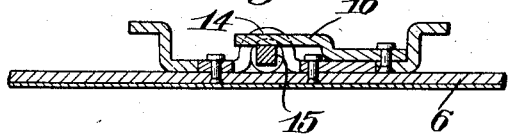
WITNESSES:
Nelson H. Copp
Walter B. Payne
INVENTOR
Harry R. Darling
BY
his ATTORNEYS

UNITED STATES PATENT OFFICE.

HARRY R. DARLING, OF ROCHESTER, NEW YORK, ASSIGNOR TO EASTMAN KODAK COMPANY, OF ROCHESTER, NEW YORK, A CORPORATION OF NEW YORK.

FOLDING CAMERA.

1,211,683.  Specification of Letters Patent.  Patented Jan. 9, 1917.

Application filed July 24, 1915. Serial No. 41,765.

*To all whom it may concern:*

Be it known that I, HARRY R. DARLING, of Rochester, in the county of Monroe and State of New York, have invented certain new and useful Improvements in Folding Cameras; and I do hereby declare the following to be a full, clear, and exact description of the same, reference being had to the accompanying drawings, forming a part of this specification, and to the reference-numerals marked thereon.

My present invention relates to photography and more particularly to photograhic cameras of the folding type in which a door, usually hinged, serves both as a closure for the bellows chamber at the front of the camera and as a camera bed when the camera is extended and the door is in open position.

The invention has for its object to provide a conveniently arranged single member or element that may serve both as a latch for locking the door in closed position and, when released, as a leg beneath the door or bed which will support the camera at the front. When the device, considered as a leg, is in its folded position it is in its operative position considered as a latch.

Further objects of the invention are to provide a device that is both simple and sightly and adapted to be produced and applied to the camera at a low cost.

To these and other ends the invention resides in certain improvements and combinations of parts all as will be hereinafter more fully described, the novel features being pointed out in the claims at the end of the specification.

In the drawings: Figure 1 is a side elevation of a folding camera provided with a leg latch constructed in accordance with and illustrating one embodiment of my invention, the camera being shown in its upright extended position with the device serving as a leg beneath the bed; Fig. 2 is a front elevation of the camera when closed, the device being shown in its capacity as a latch or lock; Fig. 3 is an elevation of the camera resting on its side with my device still serving as a leg but in another position; Fig. 4 is a section taken substantially on the line 4—4 of Fig. 2; Fig. 5 is an enlarged partial section taken substantially on the line 5—5 of Fig. 2, and Fig. 6 is an enlarged partial section taken through the bed substantially on the line 6—6 of Fig. 3.

Similar reference numerals throughout the several figures indicate the same parts.

The camera shown in the present instance comprises a body 1 having the usual bellows chamber 2 (Figs. 4 and 5) in which is stored the bellows 3, front 4 and the carriage 5 for the latter when the camera is folded. A door 6 preferably hinged at 7 closes the front opening of the chamber 2 to confine the parts as in Fig. 2 and when extended as shown in Fig. 1, the door serves as a bed upon which the front 4 is projected being supported rigidly with respect to the body by links 8. The door 6 is narrower than the body as is also, preferably, the chamber 2, which the door closely fits.

In the practice of my invention, I provide a locking means for normally holding the door closed which may comprise a pin 9 (Figs. 4 and 5) fixed to the body to project into the chamber 2. A latch lever 10 pivoted at 11 preferably on the top edge of the door 6, or that edge which is parallel to the hinge 7, swings in a plane at right angles to the door and is adapted to assume a position substantially flush with the outer face of the door when closed so that it is confined between the edge of the door and a wall of the chamber or opening 2, as shown in Figs. 2, 4 and 5. In this position, a lip 12 engages under the pin 9 and effects the locking function. A laterally turned ear 13 on the operating end of the lever serves as a projecting finger hold accessible to the operator for releasing the latch. When released, the latch lever 10 is swung toward a position at right angles to the door and in that position it is intended to serve as a leg beneath the door or bed 6 for maintaining the camera upright as shown in Fig. 1.

The point 7 at which the door is hinged to the body is usually well above the bottom of the latter for reasons well known to the camera maker and hence the necessity for a leg. For equally well known reasons, the camera of this folding type is often laid on its side to make an exposure, as shown in Fig. 2. The door or bed 6, being narrower than the body, a leg at the front is also necessary in this circumstance and to provide it I arrange the pivot 11 of the lever 10 a little offset from the medial line of the bed or door so that when rotated through 180° from its locking position to another position substantially in line therewith, it will project beyond the edge of the bed or door and make up for the greater width of the body again bringing the optical axis of the camera horizontal, as shown in Fig. 3.

To temporarily maintain the lever 10 in any one of the three positions described, namely, the locking position of Fig. 2, and the leg positions of Figs. 1 and 3, respectively, I divide the bearing 14 (Figs. 5 and 6) for the pivot 11 and form a plurality of flat faces 15 on the intermediate portion of the latter. A leaf spring or yielding finger 16 rides on these faces or "flats" and, when squarely engaged with any one of them, slightly resists further turning movement of the lever. There is one flat face for each position and the lever is thus centered in any one position, selectively. By, in this way, having one element 10 performing the three functions of latch, bottom leg and side leg, the structure of the camera is greatly simplified and the cost of production lowered besides which there is a matter of greater convenience to the operator.

I claim as my invention:

1. In a folding camera, the combination with a body and a door therefor narrower than the body and constituting a bed when extended, of a latch for locking the door having one position at right angles to the latter in which it serves as a leg when the door is extended and the camera is upright and another position other than the locking position parallel with the door and in which it projects beyond the side thereof and also serves as a leg when the door is extended and the camera is on its side.

2. In a folding camera, the combination with a body and a door therefor narrower than the body and constituting a bed when extended, of a latch arm having three operative positions in one of which it locks the door in closed position and in the other two of which it serves as a leg for the door when extended to support the camera in either an upright position or on its side, respectively.

3. In a folding camera, the combination with a body having an opening in the front thereof and a door adapted to close the opening or to be extended to constitute a bed, of a latch lever pivoted to one of said members to swing in a plane at right angles to the door when the latter is closed and coöperating with the other member to lock the door closed said latch lever being arranged to lie between the edge of the door and a side of the opening when in operative position.

4. In a folding camera, the combination with a body having an opening in the front thereof and a door adapted to close the opening or to be extended to constitute a bed, of a latch lever pivoted to the edge of the door to swing in a plane at right angles thereto and coöperating with the body to lock the door closed, said latch lever being arranged to lie between the edge of the door and a side of the opening when in operative position and to stand at right angles to the door when released to serve as a leg beneath the door supporting the camera when the door is extended.

HARRY R. DARLING.

Witnesses:
P. Wesley Hart,
Frank M. Page.

Copies of this patent may be obtained for five cents each, by addressing the "Commissioner of Patents, Washington, D. C."